United States Patent [19]

Irwin

[11] Patent Number: 4,742,553
[45] Date of Patent: May 3, 1988

[54] RESOLUTION CONVERSION OF BITMAP IMAGES USING ERROR TERM AVERAGING

[75] Inventor: Kathleen Irwin, Bedford, Mass.

[73] Assignee: Wang Laboratories, Inc., Lowell, Mass.

[21] Appl. No.: 5,745

[22] PCT Filed: Jun. 26, 1986

[86] PCT No.: PCT/US86/01365
§ 371 Date: Jun. 26, 1986
§ 102(e) Date: Jun. 26, 1986

[87] PCT Pub. No.: WO88/00377
PCT Pub. Date: Jan. 14, 1988

[51] Int. Cl.[4] .............................................. G06K 9/42
[52] U.S. Cl. ........................................ 382/47; 358/77; 382/27
[58] Field of Search ............... 382/27, 41, 47; 358/77, 358/287; 340/728, 731; 364/518, 577; 355/55

[56] References Cited

U.S. PATENT DOCUMENTS

| | | | |
|---|---|---|---|
| 4,275,450 | 6/1981 | Potter | 358/77 |
| 4,381,547 | 4/1983 | Ejiri | 382/77 |
| 4,412,256 | 10/1983 | Heinzal | 358/283 |
| 4,503,469 | 3/1985 | Kato | 358/77 |
| 4,528,693 | 6/1985 | Pearson et al. | 382/47 |
| 4,602,346 | 7/1986 | Kawakami et al. | 382/47 |
| 4,628,534 | 12/1986 | Marshall | 382/47 |
| 4,633,503 | 12/1986 | Hinman | 382/47 |

OTHER PUBLICATIONS

Hou, H. S., "Digital Document Processing," John Wiley and Sons, 1983, pp. 60–67 and 93–99.
Weiman, Carl F. R., "Continuous Anti-Aliased Rotation and Zoom of Raster Images," SIGGRAPHY '80 Conference Proc., July 1980, pp. 280–293.

Primary Examiner—Leo H. Boudreau
Assistant Examiner—Donald J. Daley
Attorney, Agent, or Firm—Michael H. Shanaha; Scott K. Peterson

[57] ABSTRACT

A system for converting an input bitmap image of one resolution to an output bitmap image of a different resolution. A mapping is defined between pixels in the input bitmap and pixels in the output bitmap. An error term is used to link successive output pixel determinations. For each output value determination, the values of the mapped input pixels are added to the error term to create a test value that determines what output is generated; the output value generated therefrom is then subtracted from the test value to create the next value of the error term. The conversion system is of particular advantage in converting an image having gray scale that is represented in a binary bitmap where gray scale is represented by the ratio of the number of "on" pixels to the number of "off" pixels. The present image conversion system performs a conversion such that the output bitmap represents such gray scale particularly well.

20 Claims, 5 Drawing Sheets

RESOLUTION CONVERSION OF BITMAP IMAGES USING ERROR TERM AVERAGING

FIELD OF THE INVENTION

The present invention relates to digital image processing, and in particular to the conversion of bitmap images from one resolution to another resolution.

BACKGROUND

One form of digital representation of images is a bitmap. In representing an image in a bitmap, the image is divided into an array of picture elements (pixels) and there is a one-to-one correspondence between pixels and digital storage. In its simplest form there is one bit of storage for each pixel; this is a binary bitmap, which represents an image where each pixel is one of two values (typically displayed as black and white, and often referred to as "off" and "on"). If a bitmap includes a plurality of bits for each pixel, then pixels can be different colors or gray levels. For example, with four bits per pixel, each pixel can have one of sixteen values; sixteen-valued pixels may be displayed as sixteen gray levels, sixteen different colors, or any sixteen combinations of intensity and color.

A bitmap representation of an image can be used in a variety of ways, such as: refreshing a video display, outputting on a printer, storing in RAM or in a disk file, image processing to enhance or combine images.

It is possible to represent in bitmap form an image that has more gray levels than the bitmap has values per pixel. The simplest case is the use of a binary bitmap to represent images having gray scale. In this case, although each pixel will be either black or white, regions of the image encompassing pluralities of pixels will have apparent gray scale corresponding to the ratio of the number of black to the number of white pixels in the region. It is often desirable to convert the resolution of a bitmap image (i.e., change the size of the bitmap array used to represent an image). This may be desirable in order to adjust for output devices of different resolution (i.e., that print different numbers of dots per inch) or to change the size of an image to fit a predetermined space (in which case the operation may be referred to as scaling).

One way to accomplish a reduction in resolution is to set each output pixel to the value of one of the input pixels, and ignore the other input pixels. This approach will lead to artifacts when the pattern of input-to-output mapping correlates with dot patterns in the image: for example, if an image being subjected to a 2:1 reduction has a region where every other pixel is "on", then that region (which appeared as 50% gray level in the input) will be either all "on" or all "off" in the output (i.e., 0% or 100% gray level).

Another way to accomplish resolution conversion involve defining a mapping of input pixels to output pixels where all input pixels are used and where a plurality of input pixels are mapped to single output pixels. The value of an output pixel is determined by the average of the values of the mapped input pixels. This method has the limitation that, because the output pixels are represented by digital values, the output pixels will not in general be able to represent precisely the average of the corresponding input pixel values. A conversion by 2:1 horizontally and 2:1 vertically will serve as an example. In this case, there are four input pixels for each output pixel, and therefore the average of the input pixels that correspond to a single output pixel can have one of five values (there can be 0, 1, 2, 3, or 4 pixels "on" at one time); yet each output pixel can have only one of two values. Output pixel values could be determined as follows: 0-2 input pixels "on" results in the output pixel being "off", and 3-4 input pixels being "on" results in the output pixel being "on". If this method is used, then a region in the input image that had one quarter of the pixels "on" will result in the corresponding region of the output image having none of the pixels "on", and a region in the input image that had three quarters of the pixels "on" will result in the corresponding region of the output image having all of the pixels "on". This means that some of the gray scale representation will be lost.

When converting the resolution of an image having gray scale, it is desirable to maintain the gray scale in the converted image. It is particularly difficult to do so when gray scale is represented in a macroscopic way, in other words, by more than individual pixel values (for example, by the ratio of the numbers of "on" pixels to "off" pixels).

It is an object of the present invention to accomplish resolution conversion while maintaining gray scale, even when gray scale is represented macroscopically.

SUMMARY OF THE INVENTION

According to the present invention an input bitmap is converted to an output bitmap having a different resolution from the input bitmap. In so doing, the output pixel values are determined not just on the basis of the mapped input pixels, but also on the basis of an error term that is carried from one or more preceding output pixel determinations.

The present invention uses an error term which connects the determinations of the various output pixels to get average output pixel density that corresponds to average input pixel density with greater precision than is achieved without use of the error term.

A mapping is defined between input pixels and output pixels, which in the simplest case maps a plurality of input pixels to each output pixel. The value of each output pixel is determined as follows: Adding the current value of an error term to a representation of the average of the values of the mapped input pixels, thereby determining a test value; if the test value is greater than a threshold, setting the output pixel to a value of 1 and subtracting an offset value from the error term; if the test value is less than the threshold, setting the output pixel to a value of 0 and updating the error term to be equal to the test value.

BRIEF DESCRIPTION OF THE DRAWING

The invention is pointed out with particularity in the appended claims. The above and other advantages of the invention may be better understood by referring to the following detailed description in conjunction with the drawing, in which:

FIGS. 2A, 2C, and 2D illustrate the calculations involved in a conversion from an input bitmap to an output bitmap according to the present invention, while

FIGS. 3A and 3B show a mapping from an input bit map (FIG. 2A) to an output bitmap (FIG. 2B) for a resolution reduction of 2:1 horizontally and 4:1 vertically;

FIGS. 4A, 4B, 5A, 5B, 6A, and 6B show input bitmap to output bitmap mappings for other resolution conversion ratios; and FIGS. 7A, 7B, and 7C show, respectively, a section of an input bitmap, a section of an output bitmap, and the superimposition of the section of the output bitmap on the section of the input bitmap.

DETAILED DESCRIPTION OF AN ILLUSTRATIVE EMBODIMENT

Figure 1:
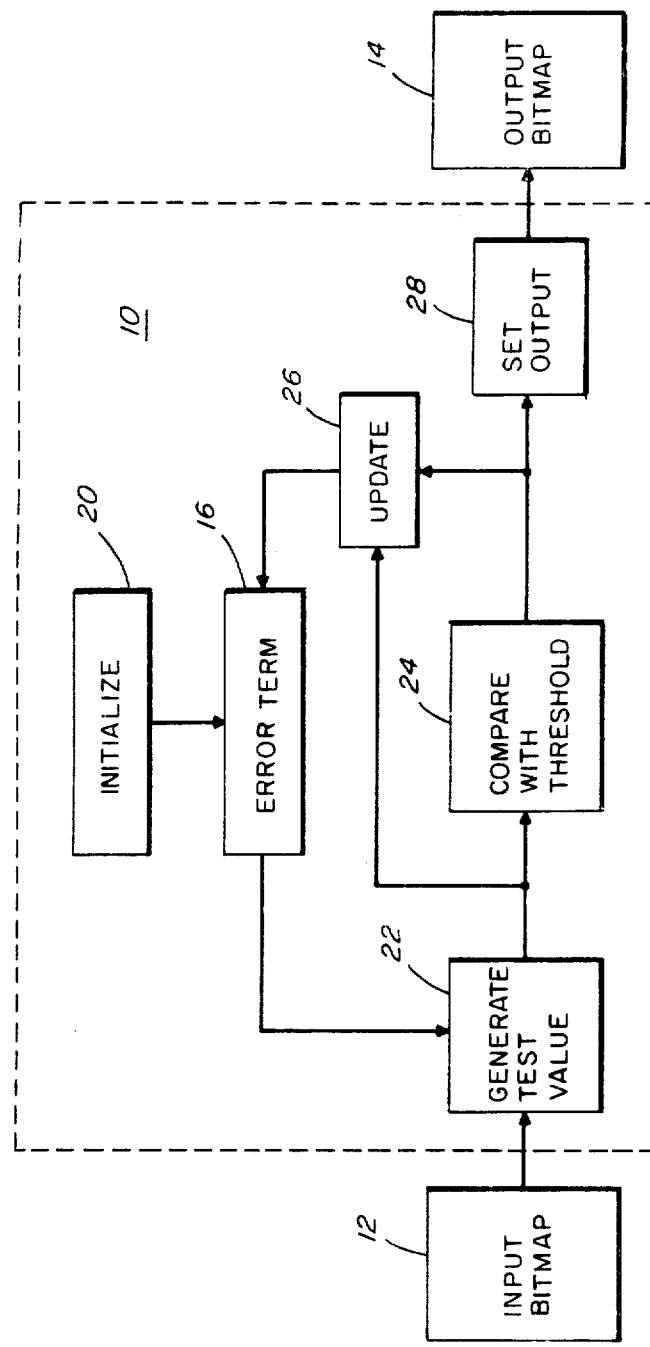
FIG. 1 shows relationships between the logical components of an image conversion system using the present invention.

In FIG. 1, an image conversion system is shown having an image converter 10 for converting an image in an input bitmap 12 to an image in an output bitmap 14. The image converter 10 includes an error term 16, an error term initializer 20, a test value generator 22, a threshold comparator 24, an update means 26 for updating the value of the error term 16, and an output means 28 for setting a pixel value in the output bitmap 14.

The error term 16 stores a value so that the value generated by the update means 26 is available to be used by the test value generator 22 to compute the next test value. There is not necessarily a memory location dedicated to storing the value of the error term. In fact, because of its central role, to the extent possible it is kept in one or more internal CPU registers.

The error term initializer 20 is arranged to set the value of the error term prior to the conversion of the first pixel of a bitmap. Subsequently, the value of the error term is controlled by the update means 26, which adjusts the value of the error term 16 each time an output pixel is set.

The test value generator 22 is arranged to define a mapping of pixels in the input bitmap 12 to pixels in the output bitmap 14. For each of the pixels in the output bitmap (in succession), the test value generator 22 adds to the current value of the error term the values of the pixels in the input bitmap that correspond to that output pixel. This sum is the test value, which is passed to the threshold comparator 24.

The threshold comparator 24 determines whether the current test value is greater or less than a threshold value. Although there may in some situation be some advantage in varying the threshold, in this illustrative embodiment the threshold is fixed. In order to make the threshold comparison a simple operation, the threshold value is zero; this reduces the threshold comparison operation to that of testing the sign of the test value (i.e., a minus sign indicates less than the threshold, a plus sign indicates greater than the threshold).

The result of the threshold comparison is used to control updating of the error term. If the threshold is exceeded (i.e., the sign of the test value is positive), then the update means 26 arranges for the error term to be equal to the test value minus an offset value. If the threshold is not exceeded, then the update means 26 arranges for the error term to be equal to the current test value; in fact, this case requires no specific action, because the test value is stored in the register that is used by the test value generator for the error term.

The offset value is equal to the maximum possible total of the values of the input pixels mapped to a single output pixel. Specifically, for a binary bitmap having a mapping where no input pixel maps to more than one output pixel, the offset value is equal to the number of input pixels mapped to an output pixel.

The result of the threshold comparison is also used to control the setting of output pixel values. If the threshold is exceeded, then the output means 28 sets the value of the output pixel to be 1; otherwise the value of the output pixel is 0.

The error term serves to link successive output pixel determinations. This provides the advantage that the ratio of "on" pixels to "off" pixels in the output bitmap will more closely correspond to the ratio in the input bitmap than if each output pixel value was determined independent of the values of the other output pixels.

Figure 2A:
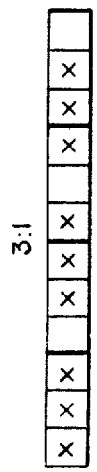
Figure 2B:
FIG. 2B shows an output bitmap that would result when not employing the present invention.
Figure 2C:
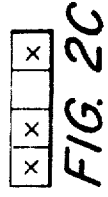
Figure 2D:
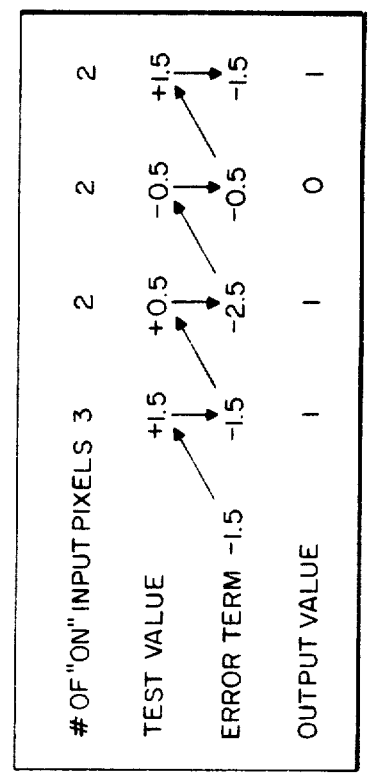

The above feature of the invention can be seen by the example illustrated in FIGS. 2A, 2B, 2C, and 2D. FIG. 2A shows a series of input pixels in which three quarters of the pixels are "on". The mapping of input pixels to output pixels for a conversion ratio of 3:1 is indicated in FIG. 2A by heavier lines every three pixels. FIG. 2B shows the output pixels when *not* employing the present invention. FIG. 2C shows the output pixels according to the present invention. In FIGS. 2A, 2B, and 2C, "on" pixels are indicated by the presence of an "X", and "off" pixels are indicated by the absence of the "X". FIG. 2D shows values computed in converting from the input bitmap of FIG. 2A to the output bitmap of FIG. 2C.

In FIG. 2B, all of the pixels are "on" because for each output pixel more than half of the input pixels that map to the output pixel are "on".

FIG. 2C illustrates the gray level preservation that can be accomplished using the present invention: three quarters of the output pixels are "on", the same ratio as for the input pixels.

FIG. 2D shows the values calculated in accomplishing the conversion from FIG. 2A to FIG. 2C. For this conversion, three input pixels are mapped to each output pixel. Therefore, an offset value of 3 is subtracted each time an "on" output pixel is generated. And therefore, the error term is initialized to a value of $-1.5$ (one half of the amount corresponding to an "on" pixel). Each test value is the sum of the number of "on" pixels and the preceding value of the error term. When the test value exceeds 0 (as is the case for the first, second, and fourth output pixels), the output value is 1 and the error term is updated to be the test value minus 3. When the test value is less than 0 (as is the case for the third output pixel), the output value is 0 and the error term is updated to be equal to the test value.

The above example started with an input image having a constant gray level for simplicity of illustration. In general the gray level will not be constant, but will vary across an image. The output bitmap produced by the present invention will not necessarily represent precisely the same gray level as in the input bitmap. Nonetheless, the gray level in the output bitmap will track the gray level of the input bitmap on the average.

It is often desirable when using a digital computer to perform calculations to restrict the manipulated values to integers. The above example could be modified in two different ways to use integer calculations: the initial value of the error term could be rounded to an integer value (this would have a small effect on the initial calculations, but no lasting effect; in fact, a convenient value such as zero could be used as the initial value, resulting in less than ideal choices for the first few pixels, but without lasting effect; the degree of the non-ideal effect will depend on how far the initial value is from the ideal initial value, which is half of the offset); or (2) all calculations could be doubled (i.e., the intial value of the error term would be −3, the value of 2 would be added for every "on" pixel, and an offset value of 6 would be subtracted whenever an "on" output pixel is generated).

In an illustrative embodiment, the present invention is implemented using a microcomputer system having various image manipulation software, including in particular a resolution conversion subroutine written in 8086 assembly language and described in further detail below.

The resolution conversion subroutine includes an initialization portion followed by a series of conversion-ratio-specific routines. The initialization portion loads input parameters into certain CPU registers and then branches to the conversion-ratio-specific routine designed to handle the conversion ratio requested. The input parameters include pointers to each of typically several rows of an input bitmap and to places where one or more rows of an output bitmap are to be stored: for example, for a 3:1×3:1 conversion pointers are provided for three input rows and one output row; for a 3:2×3:2 conversion pointers are provided for three input rows and for two output rows.

Each call to the resolution conversion subroutine does one conversion pass across an image. Each such pass will typically "consume" some input lines and generate one or more output lines, the numbers of lines depending on the conversion ratio. This subroutine will generally be called repeatedly in order to convert an entire image.

Four of the conversion-ratio-specific routines are further described below. As will be seen in the following four examples, the desire to optimize for conversion speed and the different types of mappings necessitated by different conversion ratios result in differences among the conversion-ratio-specific routines.

The mappings defined by the four exemplary conversion-ratio-specific routines are illustrated in FIGS. 3A through 6B: FIGS. 3A, 4A, 5A, and 6A illustrate input bitmaps; FIGS. 3B, 4B, 5B, and 6B illustrate the corresponding output bitmaps. In both the input and output bitmaps, the individual pixels are delineated by fine lines. In the input bitmaps, heavier lines are used to delineate groups of pixels, each group corresponding to a single pixel in the output bitmap. Each group includes an alphanumeric designation; the identical designation appears in the pixel in the output bitmap to which that group of input pixels is mapped. In the mappings of FIGS. 5A and 6A, some of the input pixels are not mapped to any output pixel; these unmapped pixels are indicated by the designation "X". The alphabetic order of the designations corresponds to the order in which the output pixel values are generated (A, B, C, D and so forth, and A1, A2, A3, A4, B1, B2, B3, B4, and so forth); this is the order in which the error term is propagated.

The following is a guide to the "structured English" used below to describe the four conversion-ratio-specific routines:

indented statements following an "if" statement indicate actions that are taken if the condition is true;

indented statements following a "for" statement are repeated as indicated in the "for" statement;

indented statements following a colon (":") are an expanded description of the action described in the statement ending with the colon;

Single letter or number labels on the left edge indicate points to which statements branch.

In the following descriptions, the term "block" refers to that rectangular group of input pixels that is the basic repeating pattern by which the conversion is accomplished. For simple mappings, the pixels in a block all map to a single output pixel. For more complex mappings, two or more output pixels are generated from a single input block.

The input bitmap is represented as N streams of bytes, where N depends on the vertical conversion ratio. The output bitmap is represented as M streams of bytes where M depends on the vertical conversion ratio.

The output mask is a byte or word with a single bit set. This bit is shifted so as to be in the bit position corresponding to the current output pixel. Prior to determining the values of any output pixels in a particular output byte, the byte is set to zero. When an output value is determined to be one, the output mask is ORed with the output byte; when an output value is determined to be zero, no action on the output byte is needed.

2:1×4:1

Figures 3A, 3B, 4A, 4B:
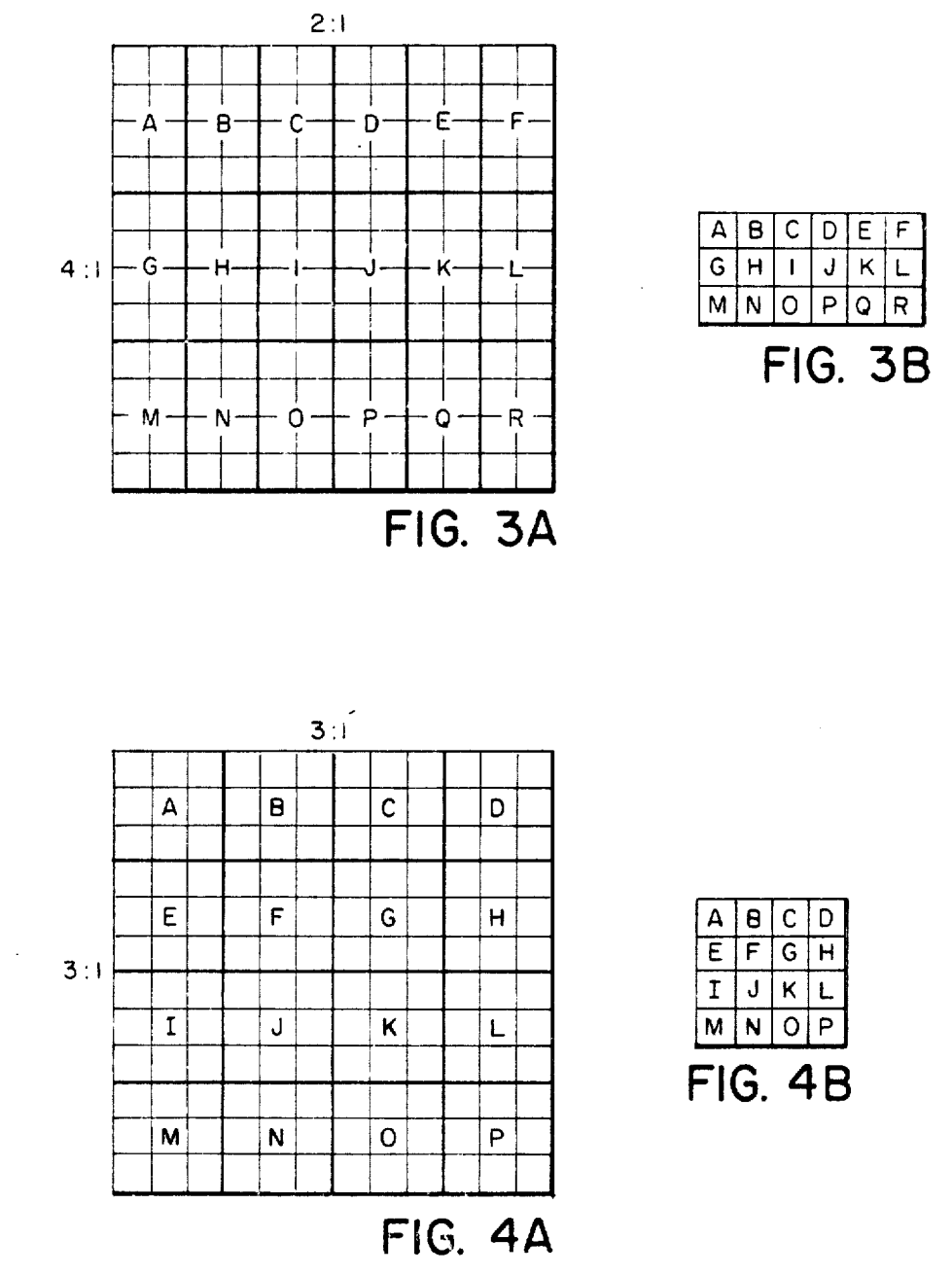

The mapping is shown in FIGS. 3A and 3B for a 2:1 horizontal by 4:1 vertical resolution reduction. Some features of the routine for this conversion are the following:

(1) tests are made for the special cases of a byte having all 1s or all 0s, in which cases processing of the individual bits of the byte is not necessary;

(2) adding of the values of the input pixels is done by shifting and testing.

The 2:1×4:1 conversion is accomplished generally as indicated by the following structured English:

Initialize the error term to −4.
L Load next 16-bit word of each of 4 lines (2:1 horizontal means that 1 input word will correspond to 1 output byte; 4:1 vertical means that 4 input lines are needed to compute 1 output line).
If the 4 words are equal to each other,
   If the 4 words are equal to 0,
      Output a byte of all 0s and branch to L (to load next set of 4 words) (the error term is unchanged).
   If the 4 words are equal to all 1s,
      Output a byte of all 1s and branch to L (to load next set of 4 words) (the error term is unchanged).
Initialize the output mask and initialize (to zero) the output byte.
B Add the bits in the next block to the error term, i.e.:
   For each of the four input words,
      Rotate the word and add carry to the error term.
      Rotate the word again and add carry to the error term.
If the error term is positive,
   Set the next output bit (i.e., OR output mask with output byte).
   Subtract 8 from the error term.
Rotate the output mask.
If the output mask has not rotated all the way around (i.e. 8 output bits have not yet been completed),
   Branch to B (to do next block).
Store the output byte.
If not at the end of the input data,
   Branch to L (to load next set of 4 input words).
Exit.

Note that a 1:1×2:1 conversion benefits from a similar test for a special case: if a byte from the first line is equal to the corresponding byte from the second line, then that byte is output with no change in the error term and without need to process the individual bits of the byte.

3:1×3:1

The mapping is shown in FIGS. 4A and 4B for 3:1 horizontal by 3:1 vertical resolution reduction. Some features of the routine for this conversion are the following:

(1) adding of the values of the input pixels is done by "mask and lookup";

(2) to use integer arithmetic, the initial value of the error term is rounded from the ideal value of −4.5; and (3) a block can span byte boundaries.

Prior to any calls to the resolution conversion routines, various system initialization operations are performed including execution of a subroutine that generates a 256 entry lookup table by counting the 1s in each of the single byte values 0–255. This lookup table is used by the below-described routine to count "on" pixels.

The 3:1×3:1 conversion is accomplished generally as follows:
  Initialize the output mask.
  Initialize the output byte to zero.
  Initialize count of input bits left to zero (the bits left to be processed in the current input word).
  Initialize the error term to −5.
L Add 8 to bits left.
  For each of the 3 input words (one for each of 3 input lines),
    Put the 8 bits of the next input byte into the bit positions in the input word following any bits left to be processed.
B For each of the 3 input words,
    Add the values of the 3 least significant bits to the error term, i.e.:
      Mask out all but all but the 3 least significant bits.
      Use this as an index to a lookup table to retrieve a value from the table which is the number of 1s in the index to the table.
      Add this number to the error term.
      Shift the input word by 3 bits.
    If the error term is positive,
      Set the next output bit.
      Subtract 9 from the error term.
    Rotate the output mask.
    If the output mask has rotated all the way around,
      Store the output byte.
      Initialize the output byte to zero.
    Subtract 3 from bits left.
    If there are still more than 3 bits left (to be processed in the current set of input words),
      Branch to B (process next block).
  If not at end of input data,
    Branch to L (load next 8 bits into each of the input words).
  Exit.

3:2×3:1

Figures 5A, 5B, 6A, 6B:
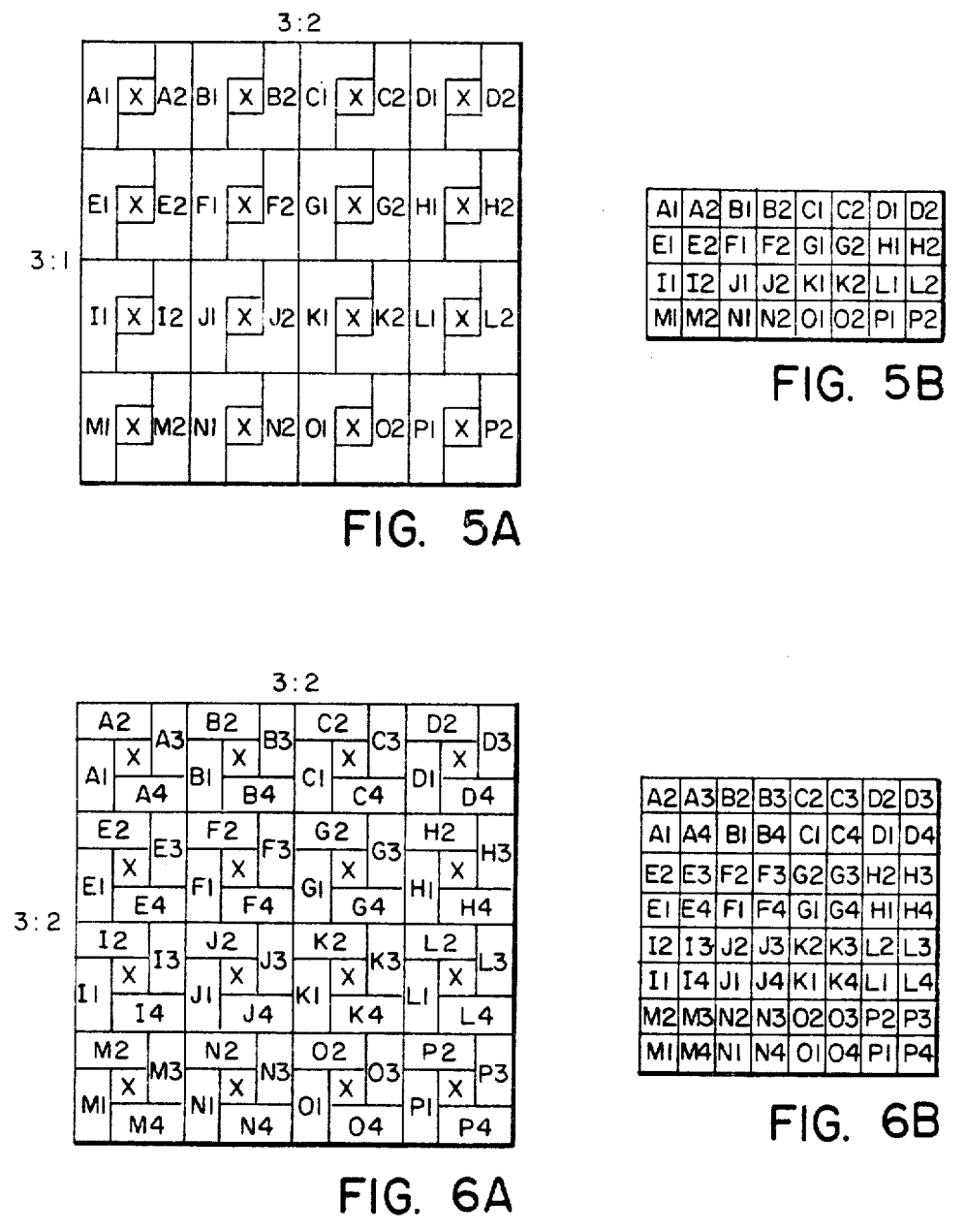

The mapping is shown in FIGS. 5A and 5B for 3:2 horizontal by 3:1 vertical resolution reduction. A feature of the routine for this conversion is that a complex mapping is used, in which:

(1) there are two output pixels per block of input pixels;

(2) the set of input pixels that maps to a single output pixel is not in the form of a rectangular array; and (3) not all input pixels are mapped to output pixels.

The 3:2×3:1 conversion is accomplished generally as follows:
  Initialize the output mask.
  Initialize the error term to −2.
  Initialize the output byte to zero.
  Initialize the pattern flag to 1 (processing pattern repeats every 3 input bits, after a new input byte is retrieved this indicates where in the processing pattern to continue; this flag has 3 possible values: 1, 2, or 3).
L Load next byte of each of 3 input lines.
  Set bit counter to 8 (8 input bits will be processed before another load is required).
  Branch to 1, 2, or 3 depending on the value of the pattern flag.
1 Process the first third of the processing pattern, i.e.:
    Shift 1st byte and add carry to the error term.
    Shift 2nd byte and add carry to the error term.
    Shift 3nd byte and add carry to the error term.
  Decrement the bit counter.
  If the bit counter is nonzero,
    Branch to 2.
  Set the pattern flag to 2.
  If there is more input data,
    Branch to L.
  Exit.
2 Process the second third of the processing pattern, i.e.:
    Shift 1st byte and add carry to the error term.
    If the error term is positive,
      Set the output bit.
      Subtract 4 from the error term.
    Shift 2nd byte (and ignore carry—this input bit has no effect on the output because it is not mapped to any output pixel—see FIG. 5A).
    Rotate the output mask.
    Shift 3rd byte and add carry to error term.
  Decrement the bit counter.
  If the bit counter is nonzero,
    Branch to 3.
  Set the pattern flag to 3.
  If there is more input data,
    Branch to L.
  Exit.
3 Process the last third of the processing pattern, i.e.:
    Shift 3rd byte and add carry to the error term.
    Shift 2nd byte and add carry to the error term.
    Shift 1st byte and add carry to the error term.
    If the error term is positive,
      Set the output bit.
      Subtract 4 from the error term.
    Rotate the output mask.
    If the output mask has rotated all the way around,
      Store the output byte.
      Initialize the output byte to zero.
  Decrement the bit counter.
  Set the pattern flag to 1.
  If there is more input data,
    Branch to L.
  Exit.

3:2×3:2

The mapping is shown in FIGS. 6A and 6B for 3:2 horizontal by 3:2 vertical resolution reduction. A feature of the routine for this conversion is that a complex mapping is used, in which:

(1) there are four output pixels per block of input pixels;

(2) the set of input pixels that maps to a single output pixel is not in the form of a rectangular array;

(3) not all input pixels are mapped to output pixels; and (4) two lines of output pixels are generated during one pass (each pass uses 3 lines of input pixels).

The 3:2×3:2 conversion is accomplished generally as follows:

Initialize the output mask.
Initialize the error term to −1.
Initialize the output bytes to zero (in one processing pass output will be generated for 2 output lines).
Initialize the pattern flag to 1 (processing pattern repeats every 3 input bits, after a new input byte is retrieved this indicates where in the processing pattern to continue; this flag has 3 possible values: 1, 2, or 3).

L Load the next input byte of each of 3 lines.
  Set the bit counter to 8 (8 input bits will be processed before another load is required).
  Branch to 1, 2, or 3 depending on the value of the pattern flag.

1 Process the first third of the processing pattern, i.e.:
  Shift 2nd byte and add carry to the error term.
  Shift 3rd byte and add carry to the error term.
  If the error term is positive,
    Set the output bit for the 2nd output line.
    Subtract 2 from the error term.
  Shift 1st byte and add carry to the error term.
  Decrement the bit counter.
  If the bit counter is nonzero,
    Branch to 2.
  Set the pattern flag to 2.
  If there is more input data,
    Branch to L.
  Exit.

2 Process the second third of the processing pattern, i.e.:
  Shift 1st byte and add carry to the error term.
  If the error term is positive,
    Set the output bit for the 1st output line
    Subtract 2 from the error term.
  Shift 2nd byte (and ignore carry—this input bit has no effect on the output because it is not mapped to an output pixel).
  Rotate the output mask.
  Shift 3rd byte and store carry in a temporary location (so that the order of the output pixels in which the error term is propagated is as indicated in FIG. 6B).
  Decrement the bit counter.
  If the bit counter is nonzero,
    Branch to 3.
  Set the pattern flag to 3.
  If there is more input data,
    Branch to L.
  Exit.

3 Process the last third of the processing pattern, i.e.:
  Shift 1st byte and add carry to the error term.
  Shift 2nd byte and add carry to the error term.
  If the error term is positive,
    Set the output bit in the 1st output line.
    Subtract 2 from the error term.
  Add the temporarily stored carry to the error term.
  Shift 3rd byte and add carry to the error term.
  If the error term is positive,
    Set the output bit in the 2nd output line.
    Subtract 2 from the error term.
  Rotate the output mask.
  If the output mask has rotated all the way around,
    Store the output bytes.
  Initialize the two output bytes to zero.
  Decrement the bit counter.
  Set the pattern flag to 1.
  If there is more input data,
    Branch to L.
  Exit.

Figures 7A, 7B, 7C:
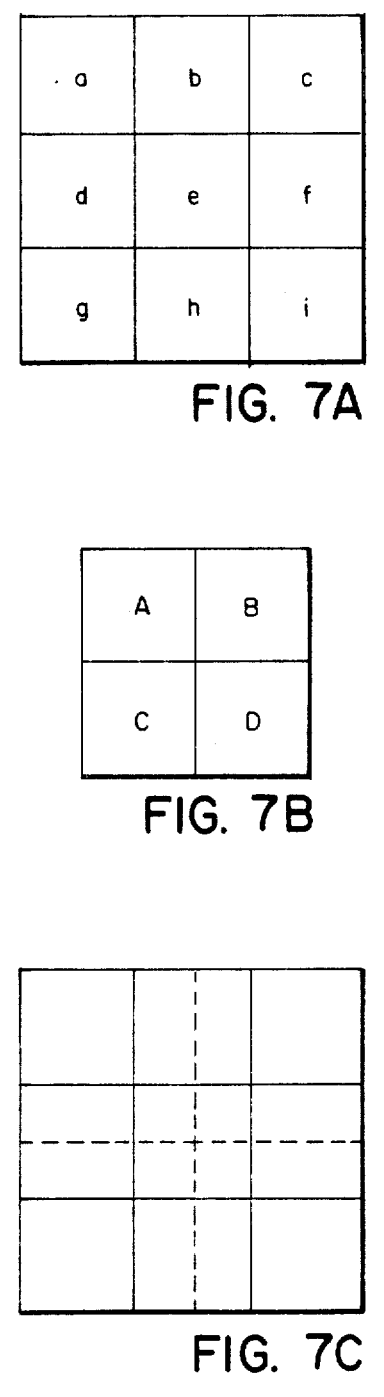

An alternative to the above-described approach to mapping involves the mapping of some input pixels to more than one output pixel and the use of a weighted average. Assume a conversion of the form N:Q by M:R. Start by logically breaking the input bitmap into an array of rectangular sections each of dimension N×M pixels (one such section is shown in FIG. 7A for the case where N=M=3); also, logically break the output bitmap into an array of rectangular sections each of dimension Q×R pixels (one such section is shown in FIG. 7B for the case where Q=R=2). The input pixels in each of the rectangular input sections map to the output pixels in the corresponding output section (so far, this is the same as the previously described mapping approach). Superimpose a Q×R array on an N×M array, as is shown in FIG. 7C for the case of a 3:2×3:2 reduction. Input pixels map to those output pixels with which they overlap. Specifically, it can be seen from FIGS. 7A, 7B, and 7C that input pixels a, b, d, and e all map to output pixel A. Note, however, that the input pixels overlap differing amounts, and note that while input pixel e maps to four output pixels (A, B, C, and D), input pixel a maps to a single output pixel (A).

When the mapping described in the previous paragraph is used, it is desirable to adjust the way input pixel totals are calculated. In particular, when computing a total for a given output pixel, each input pixel should contribute to the total to an extent proportional to the extent of that input pixels overlap with the output pixel. When computing the total for output pixel A in the case shown in FIGS. 7A, 7B, and 7C, input pixel a should be weighted twice as heavily as input pixels b and d, and input pixel a should be weighted four times as heavily as input pixel e. In order to use integer arithmetic, the total for output pixel A could be computed as follows:

$$4V_a + 2V_b + 2V_d + V_e$$

where $V_a$, $V_b$, $V_d$, and $V_e$ are the values of the corresponding input pixels. If the output pixels have binary values, then the offset to be subtracted when an output pixel is set should be 9, and the initial value of the error term should be −4.5 (although to use integer arithmetic −5 would be close enough).

Mappings where input pixels map to differing numbers of output pixels can be used without the above-described weighting of pixels. This has the advantage of being computationally simpler, but has the disadvantage that it may degrade the quality of the output image.

As described in the examples above, the error term is initialized once per row of the bitmap. Alternatively, the error term can be initialized more or less frequently. For example, the error term might be initialized once per bitmap.

In the above conversion examples all involve reduction in resolution, i.e., there are fewer pixels in the output bitmap than in the input bitmap. The present invention may also be useful in cases of increases in resolution. A 2:3×1:1 conversion is an example of an increase in resolution. The processing pattern repeats every three output pixels (which consumes two input pixels). A weighted mapping could be used such that the first input pixel maps to the first output pixel with a weight of 2; the first input pixel and the second input pixel each map to the second output pixel with a weight of 1; and the second input pixel maps to the third output pixel with a weight of 2. With such weighting, the error term would ideally be initialized to −1, and an offset of 2 would be subtracted for each output pixel set "on".

In the above examples, the error term is carried through a horizontal pass across a bitmap. One might alternatively carry the error term in two directions: vertically as well as horizontally. An error term can be initialized for each column in a bitmap. (As processing is done on a row-by-row basis, there is no need to create error terms for all the rows at once.) For each output pixel, the values of the mapped input pixels are added to the sum of the row error term and the appropriate column error term. When an updated error term is computed, half of it could be allocated to become the updated column error term and half could become the updated row error term.

In the above-examples there is one bit per pixel in both the input and output bitmaps. The invention may also be employed where each pixel in either the input or output bitmaps is represented by more than one bit, including where the input and output bitmaps use differing numbers of bits per pixel.

While the above description is in terms of "gray level", the pixel values could actually represent colors. Further, if used with color images, one might alternatively use a plurality of error terms, one for each color. This would be useful in maintaining the same relative proportions of the different colors in the output bitmap as in the input bitmap.

The foregoing description has been limited to specific embodiments of the invention. Additional advantages and modifications will be apparent to those skilled in the art. The invention is, therefore, not limited to the specific details, representative apparatus, and illustrative examples shown and described in this specification. Rather, it is the object of the appended claims to cover all such variations and modifications as come within the true spirit and scope of the invention.

What is claimed as new and desired to be secured by Letters Patent of the United States is:

1. A method of converting an image in an input bitmap to an image in an output bitmap, each bitmap being a set of pixels having values, comprising:
    (A) defining a mapping between pixels in the input bitmap and pixels in the output bitmap;
    (B) providing for storage of an error term;
    (C) for each current pixel in the output bitmap, determining an output value as follows:
        (1) determining a test value from a combination of the error term and the values of the input pixels mapped to the current output pixel,
        (2) determining the output value from the test value, and
        (3) updating the error term based on the test value and the output value.

2. The method of claim 1 wherein the output value and the updated error term are determined as follows:
    if the test value is greater than a threshold, then
        (a) the output value is determined to be 1, and
        (b) the updated error term is the test value minus an offset value;
    if the test value is not greater than the threshold, then
        (a) the output value is determined to be 0, and
        (b) the updated error term is equal to the test value.

3. The method of claim 1 wherein the test value is a sum of the error term and a value representing a total of the values of the input pixels mapped to that output pixel for which an output value is being determined.

4. The method of claim 2 wherein the test value is the sum of the error term and a value representing a total of the values of the input pixels mapped to that output pixel for which an output value is being determined.

5. The method of claim 1 wherein each pixel in the output bitmap is associated with one of a plurality of rows, and wherein for each row, the error term is initialized for generation of a first output pixel value of the row, and for each succeeding pixel in the row the error term is updated on the basis of the preceding output pixel value.

6. The method of claim 1 wherein the error term is initialized for generation of a first output value, and for each succeeding output value the error term is updated on the basis of the preceding output value.

7. The method of claim 4 wherein each pixel in the output bitmap is associated with one of a plurality of rows, and wherein for each row, the error term is initialized for generation of a first output pixel value of the row, and for each succeeding pixel in the row the error term is updated on the basis of the preceding output pixel value.

8. The method of claim 4 wherein the error term is initialized for generation of a first output value, and for each succeeding output value the error term is updated on the basis of the preceding output value.

9. The method of claim 4 wherein
    input pixels are mapped to output pixels such that no input pixel is mapped to more than one output pixel and a plurality of input pixels are mapped to each output pixel,
    the offset value is equal to the number of input pixels that are mapped to that output pixel for which an output value is being determined, and
    the value representing a total is the count of the number of input pixels having values of 1 that are mapped to that output pixel for which an output value is being determined.

10. The method of claim 4 wherein
    input pixels are mapped to output pixels such that at least some of the input pixels are each mapped to a plurality of output pixels, and
    the value representing a total is a weighted count of the input pixels having values of 1 that are mapped to that output pixel for which an output value is being determined, where the weight for each input pixel is inversely related to the number of output pixels to which it is mapped.

11. An image converter for converting an image in an input bitmap to an image in an output bitmap, each bitmap being a set of pixels having values, comprising:
    (A) means for storing an error term;
    (B) means for determining a test value for a pixel in the output bitmap from a combination of the error term and the values of each of a plurality of pixels in the input bitmap;
    (C) means for updating the error term based on the test value and the resulting output value, and for determining an output value for a pixel in the output bitmap from the test value for that output pixel.

12. The image converter of claim 11 wherein the means for updating the error term and determining an output value comprises:

(1) comparison means for determining if the test value is greater than a threshold;
(2) means responsive to the comparison means for,
  if the test value is greater than the threshold,
   (a) determining the output value to be 1, and
   (b) setting the error term to the test value minus an offset value, and
  if the test value is not greater than the threshold,
   (a) determining the output value to be 0, and
   (b) setting the error term to the test value.

13. The image converter of claim 11 wherein the means for determining a test value comprises means for defining a mapping between pixels in the input bitmap and pixels in the output bitmap, and for computing a sum of the error term and a value representing a total of the values of those pixels in the input bitmap that map onto the output pixel for which the test value is being determined.

14. The image converter of claim 12 wherein the means for determining a test value comprises means for defining a mapping between pixels in the input bitmap and pixels in the output bitmap, and for computing a sum of the error term and a value representing a total of the values of those pixels in the input bitmap that map onto the output pixel for which the test value is being determined.

15. The image converter of claim 11 wherein each pixel in the output bitmap is associated with one of a plurality of rows, the image converter further comprising means for initializing the error term prior to the determination of a first output pixel value for that row, and wherein the means for updating the error term determines the value of the error term prior to the determination of output values of subsequent pixels in that row.

16. The image converter of claim 11 further comprising means for initializing the error term prior to the determination of the value of a first output pixel, and wherein the means for updating the error term determines the value of the error term prior to the determination of output values of subsequent pixels in the output bitmap.

17. The image converter of claim 14 wherein each pixel in the output bitmap is associated with one of a plurality of rows, the image converter further comprising means for initializing the error term prior to the determination of a first output pixel value for that row, and wherein the means for updating the error term determines the value of the error term prior to the determination of output values of subsequent pixels in that row.

18. The image converter of claim 14 further comprising means for initializing the error term prior to the determination of the value of a first output pixel, and wherein the means for updating the error term determines the value of the error term prior to the determination of output values of subsequent pixels in the output bitmap.

19. The image converter of claim 14 wherein
the mapping of input pixels to output pixels is such that no input pixel is mapped to more than one output pixel and a plurality of input pixels are mapped to each output pixel,
the offset value is the number of input pixels that map onto the output pixel for which the test value is being determined, and
the value representing a total is the number of input pixels having values of 1 that map onto the output pixel for which the test value is being determined.

20. The image converter of claim 14 wherein
the mapping of input pixels to output pixels is such that at least some of the input pixels are each mapped to a plurality of output pixels, and
the value representing a total is a weighted count of the input pixels having values of 1 that map onto the output pixel for which the test value is being determined, where the weight for each input pixel is inversely related to the number of output pixels to which it is mapped.

* * * * *